US011719090B2

(12) United States Patent
Matuszyk et al.

(10) Patent No.: US 11,719,090 B2
(45) Date of Patent: Aug. 8, 2023

(54) ENHANCED CEMENT BOND AND MICRO-ANNULUS DETECTION AND ANALYSIS

(71) Applicant: Baker Hughes Oilfield Operations LLC, Houston, TX (US)

(72) Inventors: Pawel J. Matuszyk, Spring, TX (US); Douglas J. Patterson, Magnolia, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 16/822,797

(22) Filed: Mar. 18, 2020

(65) Prior Publication Data
US 2020/0300077 A1    Sep. 24, 2020

Related U.S. Application Data

(60) Provisional application No. 62/822,382, filed on Mar. 22, 2019.

(51) Int. Cl.
*E21B 47/005* (2012.01)
*G01N 29/09* (2006.01)
*G01N 29/04* (2006.01)
*E21B 33/14* (2006.01)

(52) U.S. Cl.
CPC ......... *E21B 47/005* (2020.05); *G01N 29/041* (2013.01); *G01N 29/09* (2013.01); *E21B 33/14* (2013.01); *G01N 2291/2636* (2013.01)

(58) Field of Classification Search
CPC .. G01N 29/09; G01N 29/041; G01N 29/4436; G01N 33/383; G01N 2291/2636; G01N 2291/0427; G01N 2291/044; E21B 47/005; E21B 33/14
See application file for complete search history.

(56) References Cited

U.S. PATENT DOCUMENTS

| | | | |
|---|---|---|---|
| 3,732,947 A | 5/1973 | Moran et al. |
| 3,883,841 A | 5/1975 | Norel et al. |
| 4,255,798 A | 3/1981 | Havira |
| 4,296,486 A | 10/1981 | Vasile |
| 4,805,156 A | 2/1989 | Attali et al. |
| 6,483,777 B1 | 11/2002 | Zeroug |

(Continued)

OTHER PUBLICATIONS

Pardue, G.H. et al., "Cement Bond Log—A Study of Dement and Casing Variables," SPE 453, pp. 545-555 (May 1963).

*Primary Examiner* — Suman K Nath
(74) *Attorney, Agent, or Firm* — Hogan Lovells US LLP

(57) ABSTRACT

Methods and apparatus for inspecting oilfield infrastructure components. Methods include methods of identifying a micro-annulus outside a casing in a cemented wellbore. Methods may include transmitting an acoustic pulse incident on the casing; making a measurement of a first acoustic impedance property value from pulse-echo information generated responsive to an echo of the acoustic pulse reflected from the casing; propagating a circumferential guided wave in the casing; making a measurement of a second acoustic impedance property value from propagating wave information generated responsive to the propagating acoustic wave; and determining from the first acoustic impedance value and the second acoustic impedance value a presence of a micro-annulus between the casing and the cement.

10 Claims, 6 Drawing Sheets

(56) References Cited

U.S. PATENT DOCUMENTS

| | | | |
|---|---|---|---|
| 7,024,935 B2 | 4/2006 | Paige et al. | |
| 7,311,143 B2 | 12/2007 | Engels et al. | |
| 7,660,197 B2 | 2/2010 | Barolak | |
| 7,697,375 B2 | 4/2010 | Reiderman et al. | |
| RE43,960 E | 2/2013 | Barolak | |
| 8,676,556 B2 * | 3/2014 | Deffenbaugh | G01N 23/046 703/10 |
| 9,273,545 B2 | 3/2016 | Bolshakov et al. | |
| 10,436,018 B2 | 10/2019 | Kouchmeshky et al. | |
| 2014/0177389 A1 * | 6/2014 | Bolshakov | G01V 1/50 367/35 |
| 2017/0139072 A1 * | 5/2017 | Kalyanraman | E21B 47/14 |
| 2017/0205388 A1 * | 7/2017 | Thomas | G01N 33/383 |
| 2020/0072040 A1 * | 3/2020 | Liu | G01N 29/46 |

* cited by examiner

ENHANCED CEMENT BOND AND MICRO-ANNULUS DETECTION AND ANALYSIS

CROSS-REFERENCES TO RELATED APPLICATIONS

This application claims priority from U.S. Provisional Patent Application Ser. No. 62/822,382, filed on Mar. 22, 2019, incorporated herein by reference in its entirety.

FIELD OF THE DISCLOSURE

This disclosure generally relates to borehole tools, and in particular to methods and apparatuses for conducting well logging.

BACKGROUND OF THE DISCLOSURE

Drilling wells for various purposes is well-known. Such wells may be drilled for geothermal purposes, to produce hydrocarbons (e.g., oil and gas), to produce water, and so on. Well depth may range from a few thousand feet to 25,000 feet or more. In hydrocarbon wells, downhole tools often incorporate various sensors, instruments and control devices in order to carry out any number of downhole operations. Thus, the tools may include sensors and/or electronics for formation evaluation, monitoring and controlling the tool itself, and so on.

Development of the formation to extract hydrocarbons may include installation of steel pipe, known as casing, within a borehole, including the application of cement in the annulus between borehole and casing. It is known to conduct acoustic inspection of a casing cemented in a borehole to determine specific properties related to the casing and surrounding materials. For example, the bond between the cement and the casing may be evaluated, or the strength of the cement behind the casing or the casing thickness may be estimated, using measurements of reflected acoustic waves. This may be generally referred to as casing cement bond logging, which may be accomplished using a casing cement bond logging tool conveyed through the formation along the interior of the casing while taking measurements. In other examples of cement bond logging, a circumferential guided wave may be used to evaluate casing-related properties. For example, Lamb and shear wave attenuation measurements may be used to determine cement properties.

SUMMARY OF THE DISCLOSURE

In aspects, the present disclosure is related to methods and apparatuses for inspecting oilfield infrastructure components. In general embodiments, oilfield infrastructure may include downhole tubular. Some aspects may be directed to well logging using a logging tool in a borehole in an earth formation.

Methods and apparatus for inspecting oilfield infrastructure components. Methods include methods of identifying a micro-annulus outside a casing in a cemented wellbore. Methods may include transmitting an acoustic pulse incident on the casing; making a measurement of a first acoustic impedance property value from pulse-echo information generated responsive to an echo of the acoustic pulse reflected from the casing; propagating a circumferential guided wave in the casing; making a measurement of a second acoustic impedance property value from propagating wave information generated responsive to the propagating acoustic wave; and determining from the first acoustic impedance value and the second acoustic impedance value a presence of a micro-annulus between the casing and the cement.

Methods as described above implicitly utilize at least one processor. Some embodiments include a non-transitory computer-readable medium product accessible to the processor and having instructions thereon that, when executed, causes the at least one processor to perform methods described above. Apparatus embodiments may include, in addition to specialized borehole measurement equipment and conveyance apparatus, at least one processor and a computer memory accessible to the at least one processor comprising a computer-readable medium having instructions thereon that, when executed, causes the at least one processor to perform methods described above.

Examples of some features of the disclosure may be summarized rather broadly herein in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Figure 1:
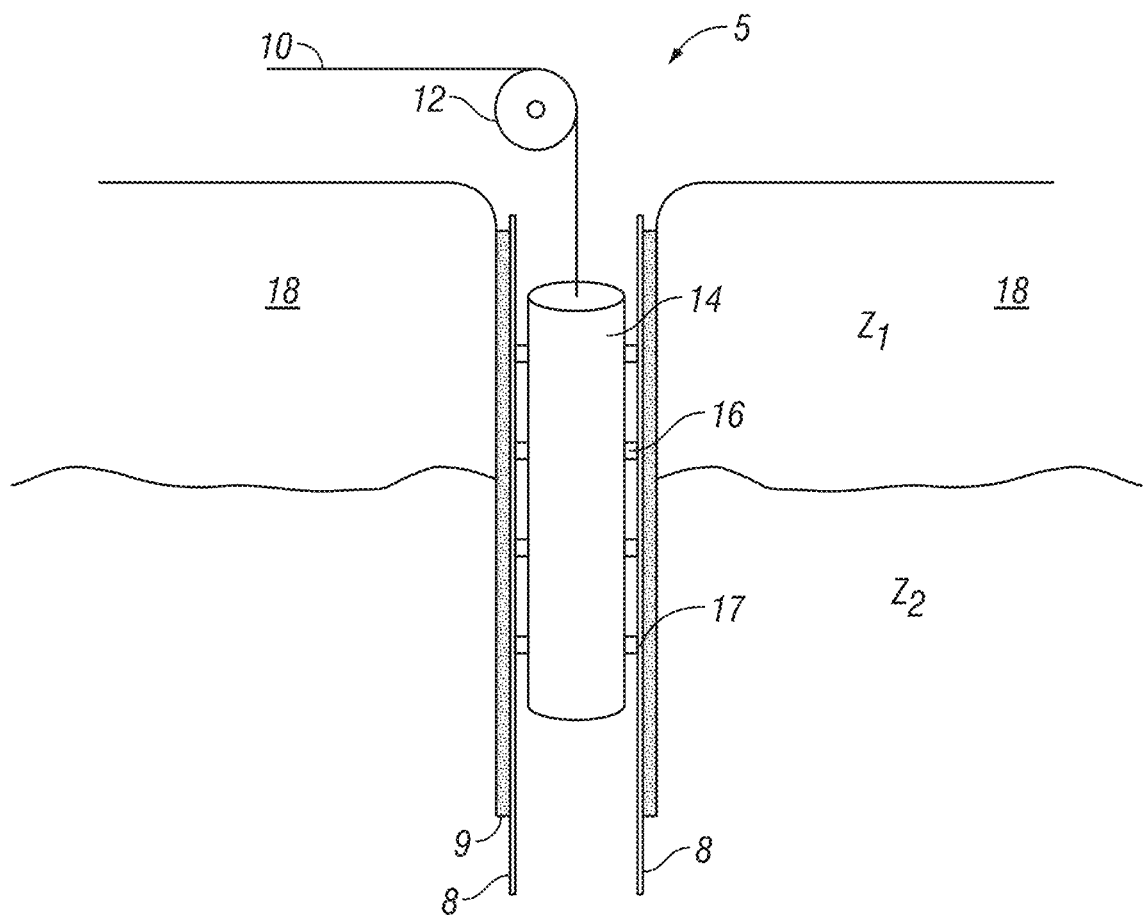
FIG. 1 depicts a partial cross section of prior art downhole cement bond log tool disposed within a wellbore.

Aspects of the present disclosure relate to apparatus and methods for well logging, including measurement and interpretation of physical phenomena indicative of parameters of interest of infrastructure installed in the formation (e.g., casing). Embodiments described herein are particularly suited to cement bond logging inspection.

The generation of acoustic signals and detection of reflections of these signals is well known, and these reflections may be conventionally processed to estimate cement thickness, cement bond quality, and so on. Cement evaluation may be carried out based on the use of detected signal amplitude decay to assess casing thickness, cement density, and bond integrity. Evaluation of other tubulars, both downhole and above ground, is known in the art.

For example, an ultrasonic pulse echo technique may be employed. A single transducer mounted on a logging tool within the casing may transmit an acoustic pulse to the casing at near normal incidence and receive reflected acoustic information. The system may be configured to generate resonance across the thickness of the casing. A portion of the acoustic wave is transferred into the casing. Attenuation may be used to characterize the bond. See for example, U.S. Pat. No. 3,732,947 to Moran et al, U.S. Pat. No. 3,883,841 to Norel et al, and U.S. Pat. No. 4,255,798 to Havira et al., each incorporated by reference herein in its entirety. See also, G.

H. Pardue, R. L. Morris, L. H. Gallwitzer. Cement Bond Log Interpretation of Cement and Casing Variables, Schlumberger 1962.

Electromagnetic-acoustic transducers (EMATs) have been used in non-destructive testing, including in the borehole, using well-understood physical phenomena. In one type of EMAT, when a wire is placed near the surface of an electrically conducting object and is driven by a current at a suitable ultrasonic frequency, eddy currents are induced in a near surface region of the object. If a static magnetic field is also present, these eddy currents experience Lorentz forces. These forces cause an acoustic excitation in the object. In a reciprocal use, an electric signal will be generated in the wire as a result of acoustic excitation in a metal placed close to a permanent magnet. Attenuation and/or reflection of the acoustic waves bear information on the defects and surroundings of the object. See, for example, U.S. patent application Ser. No. 15/288,092 to Kouchmeshky et al, which is commonly owned and incorporated by reference herein in its entirety.

Guided wave attenuation cement bond logging ('CBL') measures wave attenuation along a casing circumferential direction. Multiple transmitters and receivers may be placed inside the casing for compensated attenuation measurements. See, for example, U.S. Pat. No. 7,660,197 to Barolak et al. and U.S. Pat. No. RE43,960 to Barolak et al, incorporated by reference herein in their entirety. The mechanical properties (e.g., Young's modulus, shear modulus) of the cement layer behind the casing determine the attenuation of the waves. An EMAT may be designed to produce a single waveform, such as shear horizontal waves (SH) or Lamb waves.

In aspects of the present disclosure, cement bond logs may be generated using measurements from a plurality of acoustic (sonic) tools. The generation of these tool-specific logs is known in the art. Each type of tool may be configured for either standard pitch-catch (separate transmitter and receiver) operation, or a single transducer may configured to both transmit and receive. Transmitters and receivers may be implemented using piezoelectric transducers, EMATs, and so on.

One technique uses the variations in amplitude of an acoustic signal traveling down the casing wall between a transmitter and receiver to determine the quality of cement bond on the exterior casing wall. The acoustic signal in this case is generated by the transmitter at a low frequency range, such as, for example, 10 to 35 kHz. Excited waves modes (e.g., extensional or flexural modes) travel along the body of the casing and become increasingly more attenuated in the presence of cement than if the casing were uncemented.

Transducers may be spaced apart along the extent of the casing, so that a first transducer insonifies the casing to generate an acoustic wave, which then propagates along the casing. A refracted wave is received by a second transducer and processed to extract a particular portion of the received signal.

FIG. 1 wellbores typically include casing 8 set within the wellbore 5, where the casing 8 is bonded to the wellbore by adding cement 9 within the annulus formed between the outer diameter of the casing 8 and the inner diameter of the wellbore 5. The cement bond not only adheres to the casing 8 within the wellbore 5, but also serves to isolate adjacent zones (e.g. Z and Za) within an earth formation 18. Should the cement 9 surrounding the casing 8 be defective and fail to provide isolation of the adjacent zones, water or other undesirable fluid can migrate into the hydrocarbon producing zone, thus diluting or contaminating the hydrocarbons within the producing zone, and increasing production costs, delaying production or inhibiting resource recovery.

To detect possible defective cement bonds, downhole tools 14 have been developed for analyzing the integrity of the cement 9 bonding the casing 8 to the wellbore 5. In the present disclosure, these downhole tools 14 are lowered into the wellbore 5 by wireline 10 in combination with a pulley 12 and include transducers 16 and 17 disposed on their outer surface formed to be acoustically coupled to the fluid in the borehole. These transducers 16, 17 are generally capable of emitting acoustic waves into the casing 8 and recording the amplitude of the acoustic waves as they travel, or propagate, across the casing 8. See, for example, U.S. Pat. No. 6,483,777 to Zeroug, U.S. Pat. No. 4,805,156 to Attali et al., and U.S. Pat. No. 7,311,143 to Engels et al.

Aspects of the disclosure include enhanced cement bond and micro-annulus analysis techniques using substantially normal incident pulse-echo attenuation measurements in conjunction with attenuation measurements employing circumferential Lamb wave modes. Aspects of the disclosure include determining a presence and/or properties of a micro-annulus between the casing and the cement from pulse-echo acoustic impedance property measurements as compared to circumferential Lamb acoustic impedance property measurements. Impedance property measurements may include attenuation or the like, including as modified with customary corrections and the like. The technique demonstrates increased accuracy and sensitivity. Multiple pressure passes are not needed with this technique.

To this end, transducers 16 may be configured and employed for circumferential wave measurement, and transducers 17 may be configured and employed for pulse-echo measurement. Test results indicate opposite response trends between two measurements when a micro-annulus is present, but substantially similar responses from each measurement for well-cemented and bonded casing (i.e., substantially no micro-annulus), as well as free pipe.

General method embodiments include transmitting an acoustic pulse incident on the casing; making a measurement of a first acoustic impedance value from pulse-echo information generated responsive to an echo of the acoustic pulse reflected from the casing; propagating a circumferential acoustic wave in the casing; making a measurement of a second acoustic impedance value from propagating wave information generated responsive to the propagating acoustic wave; and determining from the first acoustic impedance value and the second acoustic impedance value a presence of a micro-annulus between the casing and the cement. The propagating wave may be an A0 Lamb wave. The acoustic pulse may be incident on the casing at a substantially normal angle of incidence.

Determining the presence of the micro-annulus between the casing and the cement may be carried out by determining that a variation metric derived from the first acoustic impedance value and the second acoustic impedance value is greater than a variation metric threshold. The variation metric may be estimated using at least one of: i) a ratio of the first acoustic impedance value and the second acoustic impedance value; and ii) a difference between the first acoustic impedance value and the second acoustic impedance value. The threshold may be determined for a specific combination of environment (e.g., lithology, cement density, etc.) and casing specification through straightforward testing and linear regression or other optimization means. The variation metric may be estimated as a function of the ratio and at least one other variation coefficient. That is, $V=f(Z_1, Z_2, a_1 \ldots a_n)$. For example, $V=Z_1/Z_2+a_1$ or alternatively, $V=Z_1^2-a_1Z_2+a_2$.

Further aspects may include generating a plurality of composite independent variables comprising two or more variables corresponding to the physical properties of the cement and/or casing, including acoustic impedance as measured by any of the above methods. That is, each composite independent variable includes two or more variables with each variable representing a different physical property. For example, composite independent variable 1 ($C_1$) may represent ($a^x \cdot b^y$)) for physical property variables a and b. Composite independent variable 2 ($C_2$) may represent ($a^x/b^y$). With more physical property values and many choices for exponents, there can be many types of combinations and permutations resulting in a large number of composite independent variables such as in the hundreds or even more. An expanded set of linearly-independent composite independent variables may be created from an original set of two independent variables ($Z_1$ and $Z_2$), four independent variables ($Z_1$, $Z_2$, nominal cement density, cement age, etc.), and so on. This example of a process is similar to individual product terms of a multinomial expansion in which the sum of the exponents of each term is equal to the power to which the multinomial is taken.

In other aspects, covariance measures of the two measurements (or two series of measurements) may be used as the metric. In other examples, a rate of decrease or increase of at least one of: i) a ratio of the first acoustic impedance value and the second acoustic impedance value; and ii) a difference between the first acoustic impedance value and the second acoustic impedance value may be used as the metric. A series of thresholds may be logically combined to generate a rule set to test for the presence of the micro-annulus.

The state of the casing can generally be separated into one of three categories: a free pipe state, a cemented pipe state in which cement bonds the casing to the formation, and a micro-annulus state in which the cement region has one or more micro-annular gaps. The presence of a micro-annular gap can indicate a weakened cementing of the casing to the formation.

Changes in ultrasonic wave propagation speed, along with energy losses from interactions with materials and/or microstructures of the casing are often used to nondestructively gain information about properties of the casing. The tool 14 fits within the casing which normally is filled with water or a mixture of water and mud. Transducer 17 (e.g., piezoelectric transducer) is configured to function as a pulse transmitter and receiver. The acoustic pulse is partially passed through casing and partially trapped in the casing with reverberations occurring in the radial segment at the thickness resonance of the casing.

In some instances, the transmitter and receiver functions can be produced by separate devices. The transducer 17 may be oriented to direct an acoustic pulse through an acoustic window. Alternatively, the pulse may be directed by an acoustic reflector to achieve desired alignment. Some or all of transducer 16 and 17 may be deployed on pads, which may be extendable from the tool body using arms. Tool 14 may be implemented with a plurality of subs. Transducers 16 and 17 may be deployed on the same sub or on several different subs. In one example, transducers 16 may be deployed on pads on at least one first sub, and transducers 17 may be deployed on a tool body on at least one second sub. Transducers 17 may be deployed above, below, or intermittently with transducers 16.

An ultrasonic wave, such as a Lamb wave or a shear horizontal (SH) wave, may be generated in the casing by creating an impulse at one region of the sample. As the wave propagates through the casing, it is affected by the casing state with respect to the formation. Once the affected wave is recorded, the casing state can be determined.

The amount of attenuation can depend on how an acoustic wave is polarized and the coupling condition between the casing and the cement. The attenuation of the acoustic wave as it propagates along the surface of the casing depends on the condition of the cement bond and is also dependent on the type of cement disposed between the casing and the formation.

More specifically, as the acoustic wave propagates along the surface of the casing, the wave loses, or leaks, energy into the formation through the cement bond—it is this energy loss that produces the attenuation of the acoustic wave. Conversely, when the casing is not bonded, a condition also referred to as "free pipe," the micro-annulus fluid outside the casing does not provide for any shear coupling between the casing and the formation. Loss of shear coupling significantly changes the entire response; shear and compressional couplings are, to some extent, independent. This result occurs since fluid has no shear modulus as well as a much lower bulk modulus in relation to cement.

Figure 2A:
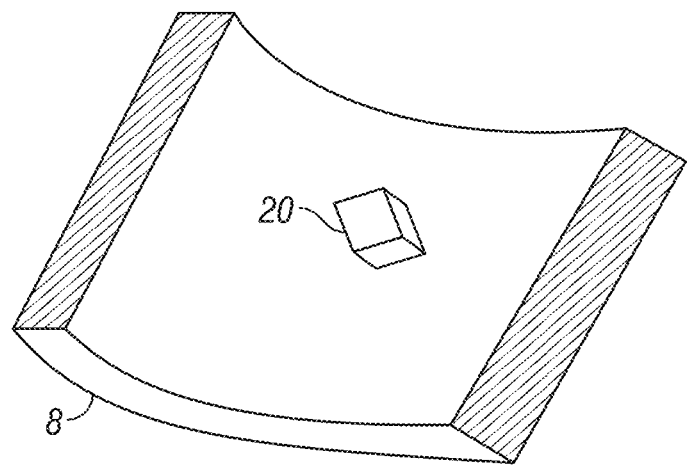
FIGS. 2A-2B illustrate a magnetic coupling transmitter disposed proximate to a section of casing.

As illustrated in FIG. 2A, a magnetically coupled transducer 20 may be positioned at any desired attitude proximate to a section of casing 8. For the purposes of clarity, only a portion of the length and diameter of a section of casing 8 is illustrated and the magnetically coupled transducer 20 is shown schematically in both FIG. 2A and FIG. 2B The magnetically coupled transducer 20 may be positioned within the inner circumference of the tubular casing 8, but the magnetically coupled transducer 20 can also be positioned in other areas.

Figure 2B:
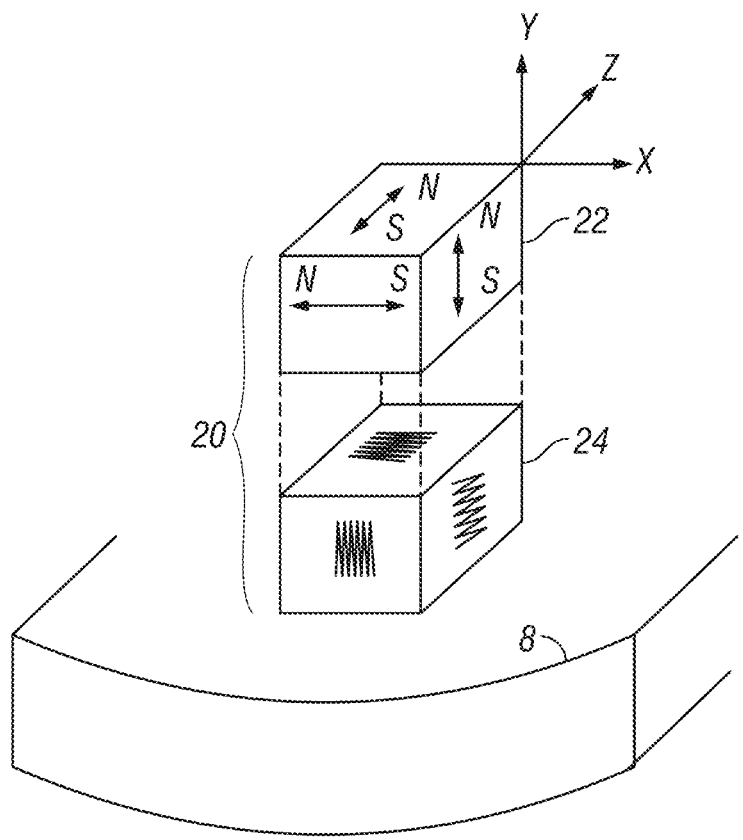

A transducer 20 capable of transmitting or receiving waveforms in orthogonal directions is schematically illustrated in FIG. 2B, but many variations as known in the art are anticipated. While a schematic magnet 22 with orthogonal magnetic fields is illustrated, a single-field relatively large magnet with multiple smaller coils 24 may be employed to form versatile transducers.

In embodiments provided by the present disclosure that are illustrated schematically in FIGS. 2A and 2B, the magnetically coupled transducer 20 includes a magnet 22 and a coil 24, where the coil 24 is positioned between the magnet 22 and the inner circumference of the casing 8. An electrical current is provided to the coil 24. The magnet 22, may be one or more permanent magnets in various orientations or can also be an electromagnet, energized by either direct or alternating current.

One or more magnets or coils may be disposed within a downhole tool to affect desired coupling and/or desired wave forms such as the direct inducing of shear waves into casing 8. While the coil is illustrated as disposed between the magnet and the casing, the coil may be otherwise disposed adjacent to the magnet. The coil 24 may be energized when the magnetically coupled transducer 20 is proximate to the casing 8 to produce acoustic waves within the material of the casing 8.

For example the coil may be energized with a modulated electrical current. Thus the magnetically coupled transducer 20 operates as an acoustic transmitter. The magnetically coupled transducer 20 can also operate as a receiver capable of receiving waves that have traversed the casing and cement. The magnetically coupled transducer 20 may be referred to as an acoustic device. As such, the acoustic devices of the present disclosure function as acoustic transmitters or as acoustic receivers, or as both. An exemplary acoustic device usable in the present disclosure may include an Electromagnetic-acoustic transducer (EMAT). Various EMAT design configurations have been used in the art, such as disclosed in U.S. Pat. No. 4,296,486 to Vasile, U.S. Pat. No. 7,024,935 to Paige et al. and U.S. patent application Ser. No. 11/748,165 of Reiderman et al., having the same assignee as the present disclosure and the contents of which are incorporated herein by reference. Alternatively, a piezoelectric acoustic device may be used.

Figure 3:
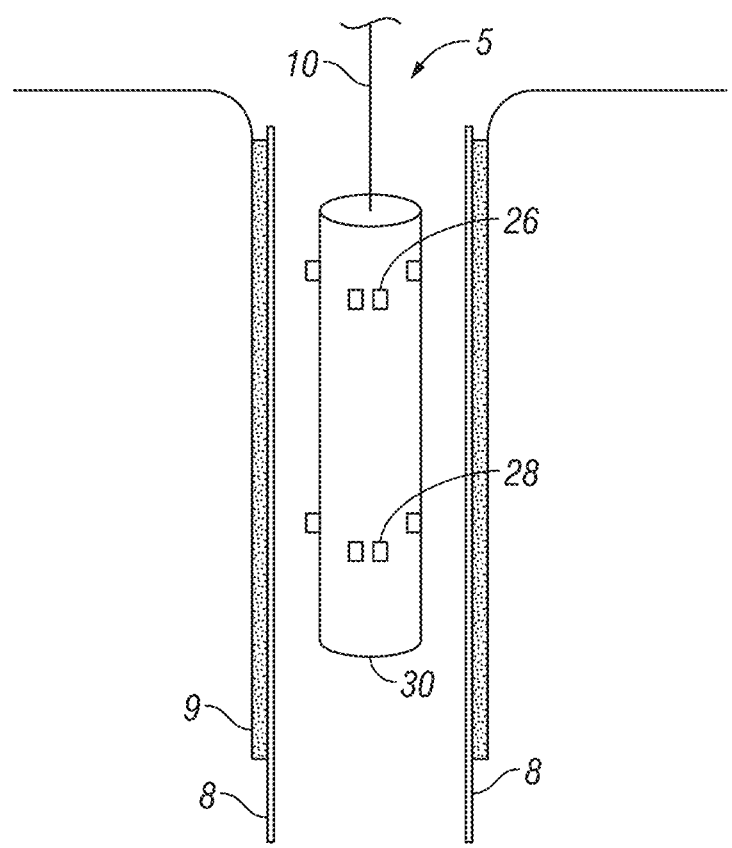
FIG. 3 shows one embodiment of the present invention disposed within a wellbore.

The present disclosure as illustrated in FIG. 3 provides a sonde 30 shown having acoustic devices disposed on its outer surface. The acoustic devices include a series of acoustic transducers, both transmitters 26 and receivers 28, where the distance between each adjacent acoustic device on the same row may be substantially the same. With regard to the configuration of acoustic transmitters 26 and acoustic receivers 28 shown in FIG. 3, while the rows 34 radially circumscribing the sonde 30 can include any number of acoustic devices (i.e. transmitters 26 or receivers 28), it is preferred that each row 34 include five or more of these acoustic devices (the preference for five or more devices is for devices with the transmitters and receivers radially arranged around the circumference e.g., FIG. 4A). The acoustic transmitters 26 may be magnetically coupled transducers 20 of the type of FIGS. 2A and 2B including a magnet 22 and a coil 24. Optionally, the acoustic transmitters 26 can include electro magnetic acoustic transducers.

Referring now again to the configuration of the acoustic transmitters 26 and acoustic receivers 28 of FIG. 3, the acoustic transducers including transmitters 26 and receivers 28 can be arranged in at least two rows where each row includes primarily acoustic transmitters 26 and a next adjacent row includes primarily acoustic receivers 28. Optionally, as shown in FIG. 3, the acoustic devices within adjacent rows in this arrangement are aligned in a straight line along the length of the sonde 30.

While only two circumferential rows 34 of acoustic devices are shown in FIG. 4, variations and placement of transducers and arrangements in rows can be included depending on the capacity and application of the sonde 30. Another arrangement is to have one row of acoustic transducers 26 followed by two circumferential rows of acoustic receivers 28 followed by another row of acoustic transducers 26.

Attenuation measurements may be conducted in two directions using arrangements of two transmitters and two receivers for acquisition of acoustic waveforms. The attenuation measurements may be combined to derive compensated values that do not depend on receiver sensitivities or transmitter power.

Figure 4C:
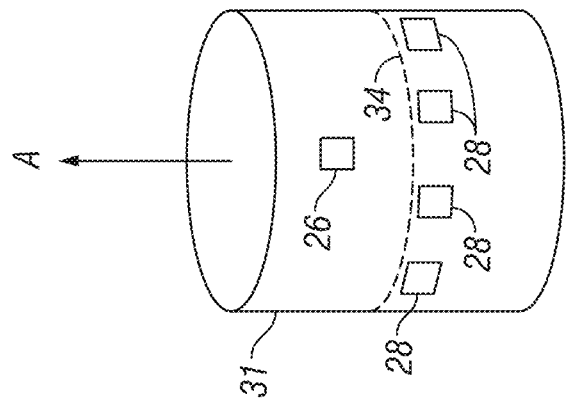
FIGS. 4A-4D depict alternative embodiments of the present invention.
Figure 4B:
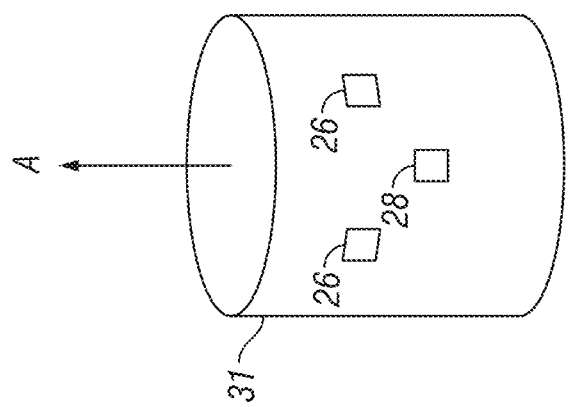
Figure 4A:
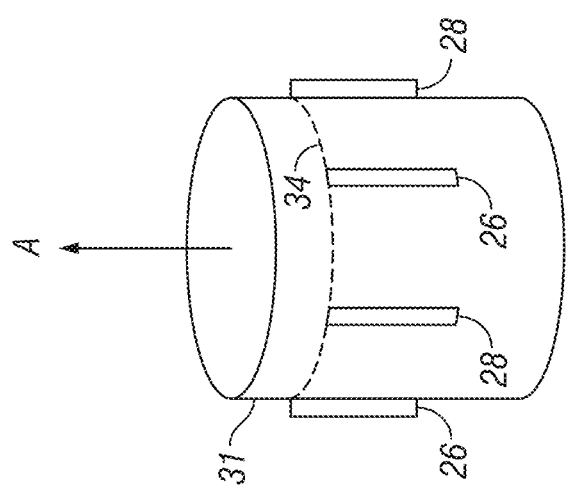

Additional arrangements of the acoustic transducers 26 and acoustic receivers 28 disposed on a sonde 31 are illustrated in a series of non-limiting examples in FIGS. 4A through 4D. In the embodiment of FIG. 4A a row of alternating acoustic transducers, transmitters 26 and receivers 28 are disposed around the sonde 31 at substantially the same elevation. The acoustic devices may be equidistantly disposed around the axis A of the sonde section 31. In an alternative configuration of the present disclosure shown in FIG. 4B, the acoustic devices are disposed in at least two rows around the axis A of the sonde section 31, but unlike the arrangement of the acoustic devices of FIG. 3, the acoustic devices of adjacent rows are not aligned along the length of the sonde 30, but instead are staggered.

Figure 4D:
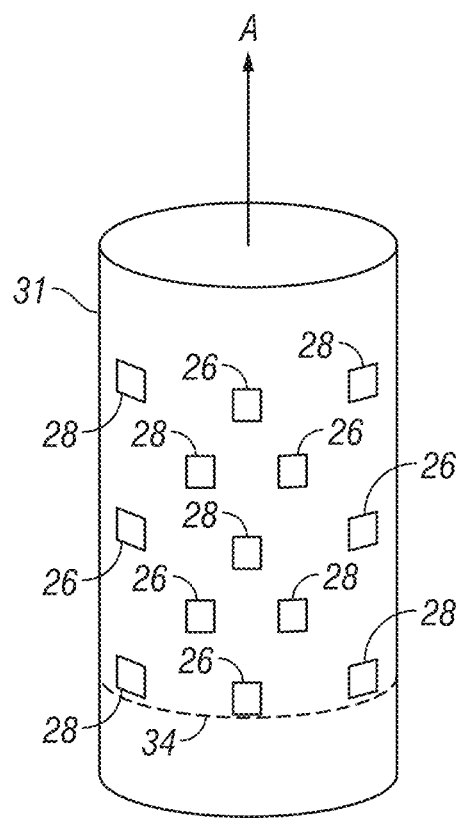

FIG. 4C illustrates a configuration where a single acoustic transmitter 26 cooperates with a group or groups of acoustic receivers 28. Optionally the configuration of FIG. 4C can have from 6 to 8 receivers 28 for each transmitter 26. FIG. 4D depicts rows of acoustic transducers where each row includes a series of alternating acoustic transducers 26 and acoustic receivers 28. The configuration of FIG. 4D is similar to the configuration of FIG. 4B in that the acoustic devices of adjacent rows are not aligned but instead are staggered. It should be noted however that the acoustic devices of FIG. 4D may be staggered in a way that a substantially helical pattern (44) is formed by acoustic devices around the sonde.

At least a portion of generated waves can be reflected or refracted upon encountering a discontinuity of material, either within the casing 8 or the area surrounding the casing 8. Material discontinuities include the interface where the cement 9 is bonded to the casing 8 as well as where the cement 9 contacts the earth formation (e.g. Z and Z of FIG. 1). Other discontinuities can be casing seams or defects, or even damaged areas of the casing such as pitting or corrosion.

As is known, the waves that propagate through the casing 8 and the reflected waves are often attenuated with respect to the wave as originally produced. The acoustic wave characteristic most often analyzed for determining casing and cement adhesion is the attenuation of the transmitted waves that have traversed portions of the casing 8 and/or cement 9.

In general, aspects of the present disclosure relate to using at least one acoustic sensor as part of one or more downhole acoustic well logging tools or distributed sensor systems to produce acoustic information responsive to an acoustic wave from the earth formation. The sensor may include at least one acoustic transmitter configured and at least one acoustic receiver disposed on a carrier in the borehole, and configured to implement techniques of the present disclosure, as described in further detail below. A receiver and transmitter may be implemented as the same transducer, different transducers, or one or more transducer arrays. Transducers may be selected from the group consisting of: (i) electro-magnetic acoustic transducers ('EMATs'), (ii) piezoelectric transducers, and (iii) wedge transducers. The information is indicative of a parameter of interest. The term "information" as used herein includes any form of information (analog, digital, EM, printed, etc.), and may include one or more of: raw data, processed data, and signals.

Transducers 17 may include a plurality of transducers in an azimuthal array about the circumference of the tool, a transducer that rotates through a plurality of azimuthal orientations via the rotation of the drill string or of an independent platform attached to the carrier, a transducer capable of sending acoustic pulses to and receiving signals from a plurality of azimuthal orientations via the use of beam-forming, and so on as will occur to those of skill in the art. In one embodiment, electronics 30 associated with sensors 40 may be configured to record and/or process the information obtained.

The system 100 may include a conventional derrick 60 erected on a derrick floor 70. A conveyance device (carrier 15) which may be rigid or non-rigid, may be configured to convey the downhole tool 10 in the wellbore 50 intersecting the earth formation 80. Drilling fluid ('mud') 90 may be present in the borehole 50. The carrier 15 may be a drill string, coiled tubing, a slickline, an e-line, a wireline, etc. Downhole tool 10 may be coupled or combined with additional tools, including, e.g., some or all the information processing system (inset). Thus, depending on the configuration, the tool 10 may be used during drilling and/or after the wellbore 50 has been formed. While a land system is shown, the teachings of the present disclosure may also be utilized in offshore or subsea applications. The carrier 15 may include embedded conductors for power and/or data for providing signal and/or power communication between the surface and downhole equipment (e.g., a seven conductor cable).

A surface control system 65 may receive signals from downhole sensor 40 and other sensors used in the system 100 and processes such signals according to programmed instructions provided to the surface control system 65. The surface control system 65 may display desired parameters and other information on a display/monitor that is utilized by an operator. The surface control system 65 may further communicate with a downhole control system 20 at a suitable location on downhole tool 10. The surface control system 65 may process data relating to the operations and data from the sensor 40, and may control one or more downhole operations performed by system 100.

Certain embodiments of the present disclosure may be implemented with a hardware environment 21 that includes an information processor 17, an information storage medium 13, an input device 11, processor memory 9, and may include peripheral information storage medium 19. The hardware environment may be in the well, at the rig, or at a remote location. Moreover, the several components of the hardware environment may be distributed among those locations. The input device 11 may be any data reader or user input device, such as data card reader, keyboard, USB port, etc. The information storage medium 13 stores information provided by the detectors. Information storage medium 13 may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. Information storage medium 13 stores a program that when executed causes information processor 17 to execute the disclosed method. Information storage medium 13 may also store the formation information provided by the user, or the formation information may be stored in a peripheral information storage medium 19, which may be any standard computer information storage device, such as a USB drive, memory stick, hard disk, removable RAM, or other commonly used memory storage system known to one of ordinary skill in the art including Internet based storage. Information processor 17 may be any form of computer or mathematical processing hardware, including Internet based hardware. When the program is loaded from information storage medium 13 into processor memory 9 (e.g., computer RAM), the program, when executed, causes information processor 17 to retrieve detector information from either information storage medium 13 or peripheral information storage medium 19 and process the information to estimate a parameter of interest. Information processor 17 may be located on the surface or downhole.

Figure 5:
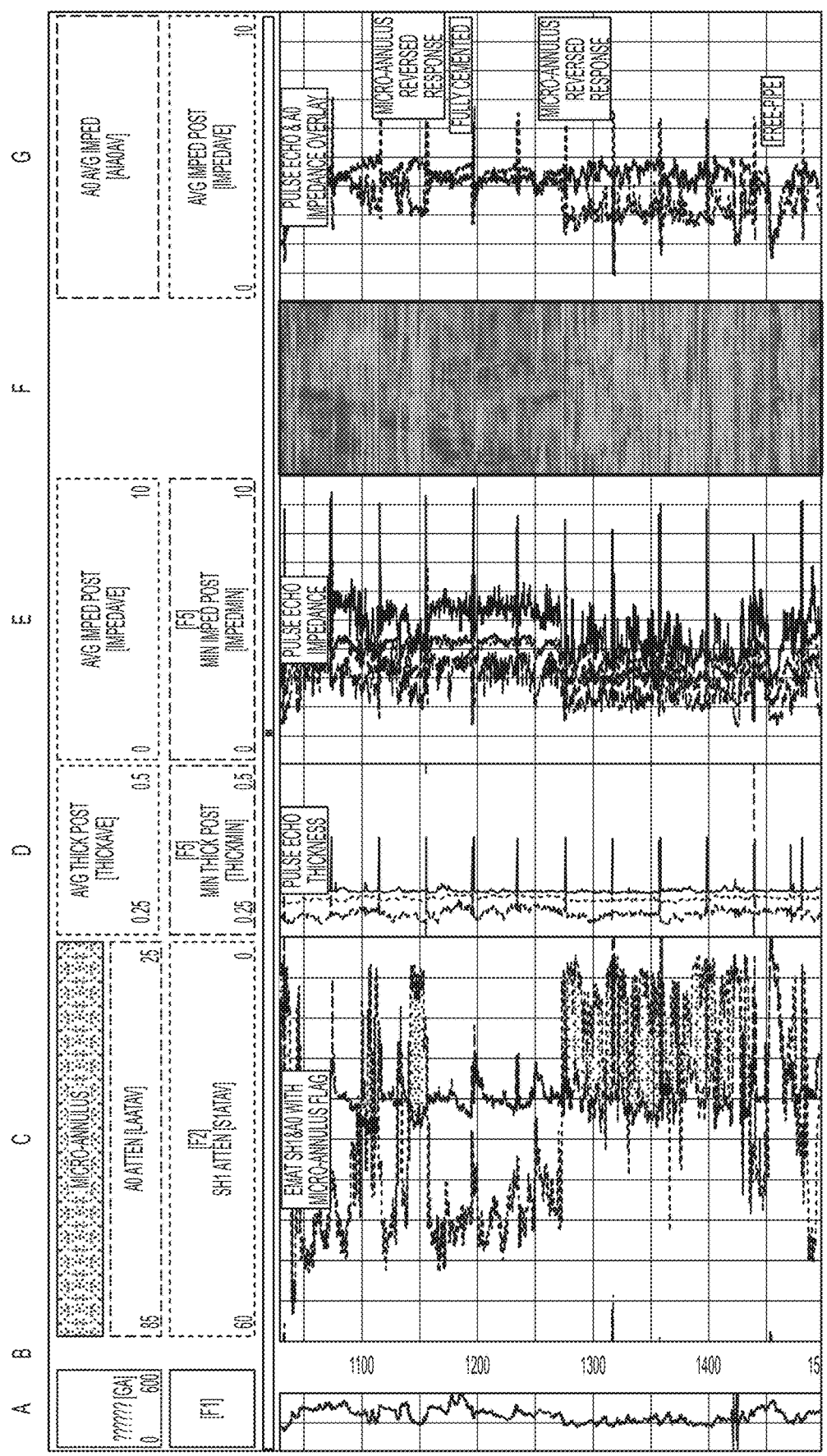
FIG. 5 shows a graphical interface illustrating a log in accordance with embodiments of the present disclosure.

FIG. 5 shows a display illustrating a casing bond log in accordance with embodiments of the present disclosure. The log display includes a GR log (Column A), depth (Column B), EMAT attenuation log (Column C), pulse-echo average thickness log (Column D), pulse echo average impedance log (Column E), graphical indicator (Column F), and micro-annulus log (Column G). The micro-annulus log includes an overlay of the pulse echo impedance curve and the EMAT impedance curve. Impedance may be calculated according to any known method. See, for example, U.S. Pat. No. 9,273,545, incorporated herein in its entirety.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, an information processing device includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

In one embodiment, electronics associated with the transducers may be configured to take measurements as the tool moves along the longitudinal axis of the borehole ('axially') using sensor 40. These measurements may be substantially continuous, which may be defined as being repeated at very small increments of depth, such that the resulting information has sufficient scope and resolution to provide an image of tubular parameters (e.g., properties of the tubular or supporting infrastructure).

In other embodiments, all or a portion of the electronics may be located elsewhere (e.g., at the surface, or remotely). To perform the treatments during a single trip, the tool may use a high bandwidth transmission to transmit the information acquired by sensors 40 and 45 to the surface for analysis. For instance, a communication line for transmitting the acquired information may be an optical fiber, a metal conductor, or any other suitable signal conducting medium. It should be appreciated that the use of a "high bandwidth" communication line may allow surface personnel to monitor and control operations in "near real-time."

Aspects of the present disclosure may be implemented using the Integrity eXplorer tool provided commercially by Baker Hughes, a GE Company, LLC.

One point of novelty of the systems illustrated in FIGS. 1A & 1B is that the at least one processor may be configured to perform certain methods (discussed below) that are not in the prior art. A surface control system or downhole control system may be configured to control the tool described above and any incorporated sensors and to estimate a parameter of interest according to methods described herein.

Method embodiments may include conducting further operations in the earth formation in dependence upon formation information, estimated properties of the reflector(s), or upon models created using ones of these. Further operations may include at least one of: ii) drilling additional boreholes in the formation; iii) performing additional measurements on the casing and/or the formation; iv) estimating additional parameters of the casing and/or the formation; v) installing equipment in the borehole; vi) evaluating the formation; vii) optimizing present or future development in the formation or in a similar formation; viii) optimizing present or future exploration in the formation or in a similar formation; and x) producing one or more hydrocarbons from the formation.

Estimated parameters of interest may be stored (recorded) as information or visually depicted on a display. The parameters of interest may be transmitted before or after storage or display. For example, information may be transmitted to other downhole components or to the surface for storage, display, or further processing. Aspects of the present disclosure relate to modeling a volume of an earth formation using the estimated parameter of interest, such as, for example, by associating estimated parameter values with portions of the volume of interest to which they correspond, or by representing the boundary and the formation in a global coordinate system. The model of the earth formation generated and maintained in aspects of the disclosure may be implemented as a representation of the earth formation stored as information. The information (e.g., data) may also be transmitted, stored on a non-transitory machine-readable medium, and/or rendered (e.g., visually depicted) on a display.

The processing of the measurements by a processor may occur at the tool, the surface, or at a remote location. The data acquisition may be controlled at least in part by the electronics. Implicit in the control and processing of the data is the use of a computer program on a suitable non-transitory machine readable medium that enables the processors to perform the control and processing. The non-transitory machine readable medium may include ROMs, EPROMs, EEPROMs, flash memories and optical disks. The term processor is intended to include devices such as a field programmable gate array (FPGA).

The term "conveyance device" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, self-propelled tractors. As used above, the term "sub" refers to any structure that is configured to partially enclose, completely enclose, house, or support a device. The term "information" as used above includes any form of information (Analog, digital, EM, printed, etc.). The term "processor" or "information processing device" herein includes, but is not limited to, any device that transmits, receives, manipulates, converts, calculates, modulates, transposes, carries, stores or otherwise utilizes information. An information processing device may include a microprocessor, resident memory, and peripherals for executing programmed instructions. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on. Thus, a processor may be configured to perform one or more methods as described herein, and configuration of the processor may include operative connection with resident memory and peripherals for executing programmed instructions.

In some embodiments, estimation of the parameter of interest may involve applying a model. The model may include, but is not limited to, (i) a mathematical equation, (ii) an algorithm, (iii) a database of associated parameters, or a combination thereof.

While the foregoing disclosure is directed to the one mode embodiments of the disclosure, various modifications will be apparent to those skilled in the art. It is intended that all variations be embraced by the foregoing disclosure.

The invention claimed is:

1. A method of identifying a micro-annulus outside a casing in a cemented wellbore, the method comprising:
    transmitting an acoustic pulse incident on the casing;
    making a measurement of a first acoustic impedance value from pulse-echo information generated responsive to an echo of the acoustic pulse reflected from the casing;
    propagating a circumferential acoustic wave in the casing;
    making a measurement of a second acoustic impedance value from propagating wave information generated responsive to the propagating acoustic wave; and
    determining from the first acoustic impedance value and the second acoustic impedance value a presence of a micro-annulus between the casing and the cement.

2. The method of claim 1 wherein determining the presence of the micro-annulus between the casing and the cement comprises determining a variation metric derived from the first acoustic impedance value and the second acoustic impedance value is greater than a variation metric threshold.

3. The method of claim 2 further comprising determining the variation metric using at least a ratio of the first acoustic impedance value and the second acoustic impedance value.

4. The method of claim 2 further comprising determining the variation metric using at least a difference between the first acoustic impedance value and the second acoustic impedance value.

5. The method of claim 1 where the propagating acoustic wave comprises a Lamb wave.

6. A method of identifying a micro-annulus outside a casing in a cemented wellbore, the method comprising:
    transmitting an acoustic pulse incident on the casing;
    making a measurement of a first acoustic impedance value from pulse-echo information generated responsive to an echo of the acoustic pulse reflected from the casing;
    propagating a circumferential acoustic wave in the casing;
    making a measurement of a second acoustic impedance value from propagating wave information generated responsive to the propagating acoustic wave; and
    estimating a property of a micro-annulus between the casing and the cement from the first impedance value and the second impedance value.

7. The method of claim 6 wherein determining the presence of the micro-annulus between the casing and the cement comprises determining a variation metric derived from the first acoustic impedance value and the second acoustic impedance value is greater than a variation metric threshold.

8. The method of claim 6 further comprising determining the variation metric using at least a ratio of the first acoustic impedance value and the second acoustic impedance value.

9. The method of claim 6 where the propagating acoustic wave comprises a Lamb wave.

10. The method of claim 6 further comprising determining the variation metric using at least a difference between the first acoustic impedance value and the second acoustic impedance value.

* * * * *